United States Patent [19]

Ogino et al.

[11] Patent Number: 4,520,857

[45] Date of Patent: Jun. 4, 1985

[54] HIGH-DURABLE PNEUMATIC RADIAL TIRES

[75] Inventors: Takao Ogino, Tokorozawa; Yoichi Watanabe, Higashimurayama; Shigehisa Sano, Akigawa, all of Japan

[73] Assignee: Bridgestone Tire Company Limited, Tokyo, Japan

[21] Appl. No.: 549,533

[22] Filed: Nov. 8, 1983

[30] Foreign Application Priority Data

Nov. 9, 1982 [JP] Japan .................. 57-195332

[51] Int. Cl.$^3$ ................ B60C 9/02; B60C 9/18
[52] U.S. Cl. .................... 152/527; 152/536; 156/124; 148/12 B; 148/12.1
[58] Field of Search ........ 152/330 R, 354 R, 354 RB, 152/355, 356 R, 359, 361; 156/124; 148/12 R, 12 B, 12.1

[56] References Cited

U.S. PATENT DOCUMENTS

| | | | |
|---|---|---|---|
| 3,895,972 | 7/1975 | Woodilla et al. | 148/12.4 |
| 3,953,250 | 4/1976 | Golland et al. | 148/36 |
| 4,106,957 | 8/1978 | Tournoy | 152/356 R |
| 4,142,919 | 3/1979 | Maiffredy et al. | 148/12 R |

Primary Examiner—Lois E. Boland
Attorney, Agent, or Firm—Sughrue, Mion, Zinn, Macpeak & Seas

[57] ABSTRACT

A high-durable pneumatic radial tire is disclosed. In the tire of this type, steel cords each made from particular steel filaments are used in at least one of belt and carcass. This steel filament has a pearlite structure having an average value of interlamellar distance between cementites of 300–500 Å, and a tensile strength of not less than 220 kgf/mm$^2$.

2 Claims, 1 Drawing Figure

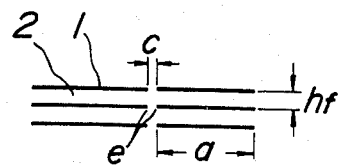

HIGH-DURABLE PNEUMATIC RADIAL TIRES

This invention relates to high-durable pneumatic radial tires, and more particularly to a pneumatic radial tire which realizes a considerable improvement of tire reinforcing performance by improving an internal structure of steel material in steel cords used as a tire reinforcement to improve a corrosion fatigue resistance of steel filaments themselves constituting the steel cord.

According to the invention, the durable life of the tire is considerably improved without deteriorating various other performance characteristics required for the tire by applying to ply materials of a carcass to solve or at least mitigate a cord-breaking-up (CBU) failure. This failure primarily results from corrosion fatigue failure or by applying to a belt, particularly an outermost layer of the belt to improve resistance to corrosion fatigue of cords for the belt produced from cracks penetrating through a tread.

Heretofore, there have not been found attempts to make studies and investigations with respect to the improvement of corrosion fatigue in steel cords for tire by observing an internal structure of steel material of the steel cord, while steel filaments produced through the conventional drawing step are merely used as a material for steel cords at present.

The inventors have made studies with respect to the internal structure of steel material in the steel cord and found out that in the conventionally produced steel filament, an average value of an interlamellar distance between cementites in pearlite structure is usually about 200–250 Å, while the average value of the interlamellar distance is made within a range of 300–500 Å by optimizing a patenting temperature at a production step of steel filament, whereby stress inside the pearlite structure, particularly stress at end portion of cementite and shearing stress between cementite and ferrite can be reduced to make advance of corrosion fatigue-crack growth slow. Hence the durable life of radial tires can largely be improved by using the latter steel filament as a material for steel cord.

According to the invention there is the provision of in a high-durable pneumatic radial tire comprising a tread portion, a pair of side portions extending from said tread portion, a pair of bead portions extending from said side portions and a carcass reinforced with a belt embedded in said tread portion, the improvement wherein steel cords each obtained by twisting plural steel filaments with a pearlite structure each having an average value of an interlamellar distance between cementites of 300–500 Å and a tensile strength of not less than 220 kgf/mm² are used in at least one of said belt and carcass. In a preferred embodiment of the invention, the steel cord applied to at least one of the belt and carcass is covered with a coating rubber having a modulus at 50% elongation of 10–40 kgf/cm².

The invention will now be described in detail with reference to the accompanying drawing, wherein:

a single FIGURE is a diagrammatic view illustrating cementite in pearlite structure.

In the single FIGURE, 1 is a cementite, 2 a ferrite, a a length of cementite, c a distance between adjoining cementite ends, e an end of cementite, and $h_f$ an interlamellar distance between cementites.

The cracks due to corrosion fatigue grow through a space between the cementite ends e, which is considered to be largely influenced by a stress state at cementite end e.

The stress at cementite end e is represented by the following equation:

$$\sigma_{max} \approx (a/h_f) \cdot (1/c) \qquad (1)$$

That is, the longer the cementite length a and the narrower the interlamellar distance $h_f$ and cementite end distance c, the larger the stress, whereby the advance of corrosion fatigue-crack growth is accelerated.

Among factors serving to reduce the stress at cementite end e ($\sigma_{max}$), the cementite length e and cementite end distance c are fairly difficult to be changed in accordance with production conditions, while the interlamellar distance $h_f$ can relatively easily be changed, for example, by changing a patenting temperature in the production step of steel filament. In general, the interlamellar distance may be widened by raising the patenting temperature, which can effective reduce the stress at cementite end ($\sigma_{max}$) of the equation (1).

However, when an austenitizing temperature before the patenting is 900°–1000° C., if the patenting temperature exceeds 700° C., a uniform pearlite structure can not be obtained, so that the patenting temperature should be not more than 700° C.

The reason why the interlamellar distance in the optimization of the patenting temperature is limited to 300–500 Å on average is based on the fact that when the interlamellar distance is less than 300 Å, the improvement of corrosion fatigue resistance is not expected satisfactorily, while when the interlamellar distance exceeds 500 Å, the tensile strength reduces considerably and the resulting filament can not be used.

In general, the wider the interlamellar distance $h_f$, the lower the tensile strength of the steel filament. In this connection, the inventors have made further studies and found that the reduction of the tensile strength can sufficiently be prevented by two operations, one of which being an operation of limiting a carbon content of steel filament to 0.75–0.85% and the other of which being an operation of limiting a reduction ratio in the drawing after the patenting to 94–98%.

Considered from a viewpoint of improving the corrosion fatigue resistance, it is advantageous to improve the tensile strength by the approaching of the reduction ratio to the upper limit rather than the increase of the carbon content. In the interlamellar distance of 300–500 Å, however, the improvement of tensile strength is made possible by only the operation for the reduction ratio on the interlamellar distance range of 300–400 Å, but the reduction of tensile strength is not sufficiently prevented by only the operation for the reduction ratio on the interlamellar distance range of 400–500 Å and in this case it is necessary to combine the operation for the reduction ratio with the operation for increasing the carbon content to 0.75–0.85%.

According to the invention, the steel filament to be used in the steel cord is required to have a tensile strength of not less than 220 kgf/mm². When the tensile strength is less than 220 kgf/mm², the reinforcing performance required as tire cord can not be developed.

According to the invention, natural rubber or synthetic rubber may be used as a coating rubber embedding steel cords therein. Particularly, when the steel cord made from the steel filament according to the invention having a specified metallic structure is used in at least one of the belt and carcass in radial tires, the coating rubber is preferable to have a modulus at 50% elongation of 10–40 kgf/cm².

When the modulus at 50% elongation is less than 10 kgf/cm², the coating rubber becomes too soft and does not come into cooperation with the steel cord and consequently strain is largely caused at the end portion of the steel cord to degrade separation resistance at belt end. On the other hand, when the modulus at 50% elongation exceeds 40 kgf/cm², the durability of steel cords for belt is apt to be degraded, i.e. the cord breaking-up is apt to be caused and also the processability lowers considerably.

According to the invention, the improvement of durable life in radial tire is conspicuous as verified by the following examples for radial tires reinforced with the steel cord according to the invention.

EXAMPLE 1

Radial tires to be tested were manufactured by applying to a carcass of the test tire steel cords each made from steel filament with a pearlite structure having an average value of interlamellar distance between cementites of from 300 Å to 500 Å. For the comparison, there was manufactured a control tire having the same construction as described above except that the interlamellar distance is 250 Å. Then, the corrosion fatigue resistance was tested with respect to these tires.

The corrosion fatigue resistance was evaluated by a durable life till occurrence of CBU failure in a drum test under the following conditions after 300 cc of water was encapsulated in a space between an inner liner and a tube in the tire during the assembling into a rim.

| Tire size | 1000 R 20 14 PR |
|---|---|
| Cord construction | 3 + 9 × 0.23 mm + 1 |
| Running condition | 60 km/hr, |

(Internal pressure 8 kgf/cm², JIS 100% load)

The test results are shown together with the interlamellar distance and tensile strength of the steel filament in the following Table 1, wherein the durable life of the tire was expressed by an index on the basis that the control tire is 100. As apparent from Table 1, the durable life is considerably improved in the tires according to the invention.

TABLE 1

|  | Control tire | Test tire | | |
|---|---|---|---|---|
| Tire No. | 1 | 2 | 3 | 4 |
| Interlamellar distance (Å) | 250 | 310 | 360 | 400 |
| Tensile strength (kgf/mm²) | 280 | 270 | 255 | 240 |
| Durable life (index) | 100 | 140 | 220 | 250 |

Note: All steel filaments had a carbon content of 0.73% and a reduction ratio of 95.0%.

Moreover, the steel cords were embedded in a coating rubber having a modulus at 50% elongation of 24 kgf/cm².

The numerical value of the interlamellar distance as described in Table 1 was obtained by changing a patenting temperature of the steel filament prior to the drawing step within a range of 500°–700° C.

Further, the interlamellar was confirmed by a transmission type electron microscope of 100 KV and shows an average value of 100 measured values.

EXAMPLE 2

Steel filaments having a tensile strength substantially equal to that of the control tire No. 1 were produced by changing the carbon content or the reduction ratio under such a condition that the patenting temperature was optimized so as to make the average value of the interlamellar distance within a range of 300–500 Å. Then, these steel filaments were used in steel cord for the carcass of the radial tire to manufacture a test tire, the corrosion fatigue resistance of which was evaluated in the same manner as described in Example 1 to obtain a result as shown in the following Table 2.

Moreover, the tire size, cord construction and running condition were the same as used in Example 1.

TABLE 2

|  | Control tire | Test tire | | | | | |
|---|---|---|---|---|---|---|---|
| Tire No. | 1 | 5 | 6 | 7 | 8 | 9 | 10 |
| Carbon content (wt. %) | 0.73 | 0.78 | 0.82 | 0.85 | 0.73 | 0.73 | 0.73 |
| Reduction ratio (%) | 95.0 | 95.0 | 95.0 | 95.0 | 95.8 | 96.8 | 97.7 |
| Interlamellar distance (Å) | 250 | 310 | 355 | 400 | 320 | 360 | 405 |
| Tensile strength (kgf/mm²) | 280 | 281 | 278 | 278 | 279 | 280 | 277 |
| Durable life (index) | 100 | 120 | 145 | 160 | 130 | 180 | 220 |

As apparent from Table 2, the durable life of the tire is significantly improved according to the invention. Particularly, it is more effective for the corrosion fatigue resistance that the reduction of tensile strength due to the widening of the interlamellar distance is prevented by the increase of reduction ratio rather than the increase of carbon content.

EXAMPLE 3

Radial tires to be tested were manufactured by applying to an outermost layer of a belt steel cords each made from steel filaments having an average value of interlamellar distance between cementites of 300–500 Å. Then, the corrosion fatigue resistance was measured with respect to these test tires. For the comparison, there was used a control tire having the same construction as described above except that the interlamellar distance is 250 Å.

The corrosion fatigue resistance was evaluated by the number of broken cords after the test tire was run on rough road over about 50,000 km. The cord breaking was caused by corrosion fatigue failure due to water content that penetrated through cracks in the tread. Therefore, the lower the broken cord number, the better the corrosion fatigue resistance.

The resistance to cord breaking-up for evaluating the corrosion fatigue resistance was represented as an index according to the following equation by dividing the run tire into four equal parts, optionally taking off tread rubber from the divided part and measuring the number of broken cord at the exposed outermost belt layer:

$$\frac{\text{Number of broken cords in the control tire No. 2}}{\text{Number of broken cords in the test tire}} \times 100$$

Thus the obtained results are shown in the following Table 3.

TABLE 3

| Tire No. | Control tire | Test tire | | |
|---|---|---|---|---|
| | 2 | 11 | 12 | 13 |
| Interlamellar distance (Å) | 250 | 310 | 360 | 400 |
| Tensile strength (kgf/mm$^2$) | 280 | 270 | 255 | 240 |
| Resistance to cord breaking-up (index) | 100 | 130 | 170 | 210 |

Note: All steel filaments had a carbon content of 0.73% and a reduction ratio of 95.0%.

As apparent from Table 3, according to the invention, the resistance to cord breaking-up is considerably improved.

In the above test, the tire size was 1000 R 20, the cord construction was 4×4×0.23 mm for high elongation cord, and natural rubber having a modulus at 50% elongation of 31 kgf/cm$^2$ was used as the coating rubber.

According to the invention, the lamellar distance between cementites is made to an appropriate value in the steel filament with a pearlite structure and the tensile strength of the steel filament is held at a predetermined value, whereby the durable lift is considerably improved when such steel filaments are used for a steel cord as a tire reinforcement.

What is claimed is:

1. In a high-durable pneumatic radial tire comprising a tread portion, a pair of side portions extending from said tread portion, a pair of bead portions extending from said side portions and a carcass reinforced with a belt embedded in said tread portion, the improvement wherein steel cords each obtained by twisting plural steel filaments with a pearlite structure having an average value of interlamellar distance between cementites of 300–500 Å and a tensile strength of not less than 220 kg/mm$^2$ are used in at least one of said belt and carcass.

2. A high-durable pneumatic radial tire according to claim 1, wherein said steel cord applied to at least one of said belt and carcass is covered with a coating rubber having a modulus at 50% elongation of 10–40 kgf/cm$^2$.

* * * * *